United States Patent [19]

Spaniol et al.

[11] Patent Number: 5,448,704
[45] Date of Patent: Sep. 5, 1995

[54] METHOD FOR PERFORMING WRITES OF NON-CONTIGUOUS BYTES ON A PCI BUS IN A MINIMUM NUMBER OF WRITE CYCLES

[75] Inventors: David G. Spaniol; Joseph Murray, both of Scottsdale, Ariz.

[73] Assignee: VLSI Technology, Inc., San Jose, Calif.

[21] Appl. No.: 207,444

[22] Filed: Mar. 7, 1994

[51] Int. Cl.⁶ .............................................. G06F 13/00
[52] U.S. Cl. .................................... 395/310; 395/821; 395/427; 365/189.05; 365/221; 364/239; 364/239.1; 364/239.7; 364/240; 364/DIG. 1
[58] Field of Search ................ 395/325, 250, 275, 425; 365/189.05, 221, 230.01

[56] References Cited

U.S. PATENT DOCUMENTS

| | | | |
|---|---|---|---|
| 4,214,302 | 7/1980 | Schmidt | 395/500 |
| 4,218,740 | 8/1980 | Bennett et al. | 395/250 |
| 4,949,246 | 8/1990 | O'Dell et al. | 395/325 |
| 5,014,187 | 5/1991 | Debize et al. | 395/425 |
| 5,045,998 | 9/1991 | Begun et al. | 395/325 |
| 5,057,998 | 10/1991 | Hirokawa | 395/275 |
| 5,068,820 | 11/1991 | Nojima et al. | 395/275 |
| 5,113,369 | 5/1992 | Kinoshita | 395/325 |
| 5,185,876 | 2/1993 | Nguyen et al. | 395/425 |
| 5,193,149 | 3/1993 | Awiszio et al. | 395/200 |
| 5,278,957 | 1/1994 | Chan | 395/250 |

Primary Examiner—Gopal C. Ray
Attorney, Agent, or Firm—Harry M. Weiss

[57] ABSTRACT

A PCI bus writes non-contiguous data in a maximum of two PCI bus write cycles. A Bridge is provided which can combine data within its write buffer such that non-contiguous data results. Some I/O devices on the PCI bus cannot handle non-contiguous data, so the Bridge detects non-contiguous data, and generates appropriate write cycles to the PCI bus to transfer this data in a contiguous fashion. The method described takes advantage of the multiple data phase capability of the PCI bus to transfer data at more than one address during one PCI bus write cycle, and optimizes these transfers to assure that all non-contiguous transfers can occur in only two PCI bus write cycles.

3 Claims, 4 Drawing Sheets

5,448,704

METHOD FOR PERFORMING WRITES OF NON-CONTIGUOUS BYTES ON A PCI BUS IN A MINIMUM NUMBER OF WRITE CYCLES

BACKGROUND OF THE INVENTION

1. Field of the Invention

This invention generally relates to methods of performing reads and writes in computer systems, and, more specifically, relates to a method for minimizing the number of write cycles on a PCI bus when the bytes to be written are not contiguous.

2. Description of the Related Art

The applicable related art is a small computer system that has an Intel Pentium microprocessor and a local Peripheral Component Interconnect (PCI) bus for Input/Output (I/O) devices that have high bus bandwidth requirements. The operation of the PCI bus can be best understood by referring to PCI Local Bus Specification, Rev. 2.0 (PCI Special Interest Group, Apr. 10, 1993), which is incorporated herein by reference.

The Pentium microprocessor has a bus width of 64 bits, known as a quad word. The PCI bus, over which the Pentium microprocessor writes data to the high bus bandwidth I/O devices, has a width of 32 bits, known as a double word. A control device known as a Pentium-to-PCI bridge (Bridge) must therefore be provided to translate data from the quad word Pentium bus to the double word PCI bus.

The Pentium microprocessor always writes data to the Bridge in contiguous bytes. The Bridge provides an optional write buffer to allow the Bridge to store up to eight 64-bit quad words written from the Pentium processor. This write buffer allows the Bridge to perform the writes from the write buffer to the PCI bus as its timing allows, eliminating the need for complex circuitry to synchronize the operation of the Bridge exactly to the operation of the Pentium bus. When the write buffer option is enabled, writes by the Pentium processor are routed through the write buffer. To minimize the number of write cycles to the PCI bus, the Bridge has a combine feature which looks for data within the write buffer that is at the same quad word address. If the Bridge finds two writes to the same quad word address, it simply combines the data in the two quad word locations according to which bytes in these locations are valid. If some of the same bytes are enabled in the more recent location within the write buffer as are enabled in a later location, the data within the more recent location takes precedence and is written during the combined write cycle.

While the Pentium processor always writes data in contiguous bytes, the combine feature of the Bridge may create combined data which has non-contiguous bytes. For example, a Pentium write of byte 0 and a second Pentium write of byte 2 to the same quad word address would be combined into a single PCI bus write cycle of bytes 0 and 2. Some I/O devices coupled to the PCI bus may not, however, be able to handle PCI bus write cycles of non-contiguous bytes. This problem has been addressed in prior art devices by detecting writes with non-contiguous bytes, and generating as many PCI bus write cycles as there were non-contiguous bytes, For example, if the valid bytes were bytes 1, 3, 5, and 7, four separate PCI bus write cycles would be generated.

Therefore, there existed a need to provide a method for detecting a PCI bus write cycle of non-contiguous bytes, and to use the multiple data phase capability of the PCI bus to transfer these non-contiguous bytes in a maximum of two PCI bus write cycles.

SUMMARY OF THE INVENTION

According to the present invention, a method for writing non-contiguous data from the Pentium-to-PCI bridge to the PCI bus in a maximum of two PCI bus write cycles is disclosed. This is accomplished by providing a boolean equation which uses the valid bits of the write buffer to determine when non-contiguous data bytes occur due to the combine feature of the write buffer. When non-contiguous bytes are detected in either double word of a write buffer rank, two PCI bus write cycles are generated. The lower word of each double word that has non-contiguous bytes is written in the first PCI bus write cycle, and the remaining bytes in the upper word of the double word that has non-contiguous bytes is written in the second PCI bus write cycle. For example, if the lower double word contains non-contiguous bytes, such as when bytes 0, 2, and 3 are valid, and the upper double word contains valid byte 4, the first PCI bus write cycle would write bytes 0 and 4 in two sequential data phases and the second PCI bus cycle would write bytes 2 and 3. If the lower double word contains valid bytes 0 and 1, and if the upper double word contains non-contiguous valid bytes 4 and 5, the first PCI bus cycle would write bytes 0 and 1 in the first data phase, and would write byte 4 in the second data phase, and the second PCI bus cycle would write byte 6. In the case where both double words contain non-contiguous bytes, as is the case when bytes 1, 3, 5, and 7 are valid, then the first PCI bus cycle would write bytes 1 and 5 in a burst cycle and the second PCI bus cycle would write bytes 3 and 7 in another burst cycle. In this manner any number of non-contiguous bytes within a quad word may be transferred onto the PCI bus with a maximum of two PCI bus write cycles, rather than the four PCI bus write cycles that are required in some cases with the system of the prior art.

The foregoing and other features and advantages will be apparent from the following description of the preferred exemplary embodiment of the invention as illustrated in the accompanying drawings.

BRIEF DESCRIPTION OF THE DRAWINGS

The preferred exemplary embodiment of the present invention will hereinafter be described in conjunction with the appended drawings, where like designations denote like elements, in which.

DETAILED DESCRIPTION OF A PREFERRED EXEMPLARY EMBODIMENT

Figure 1:
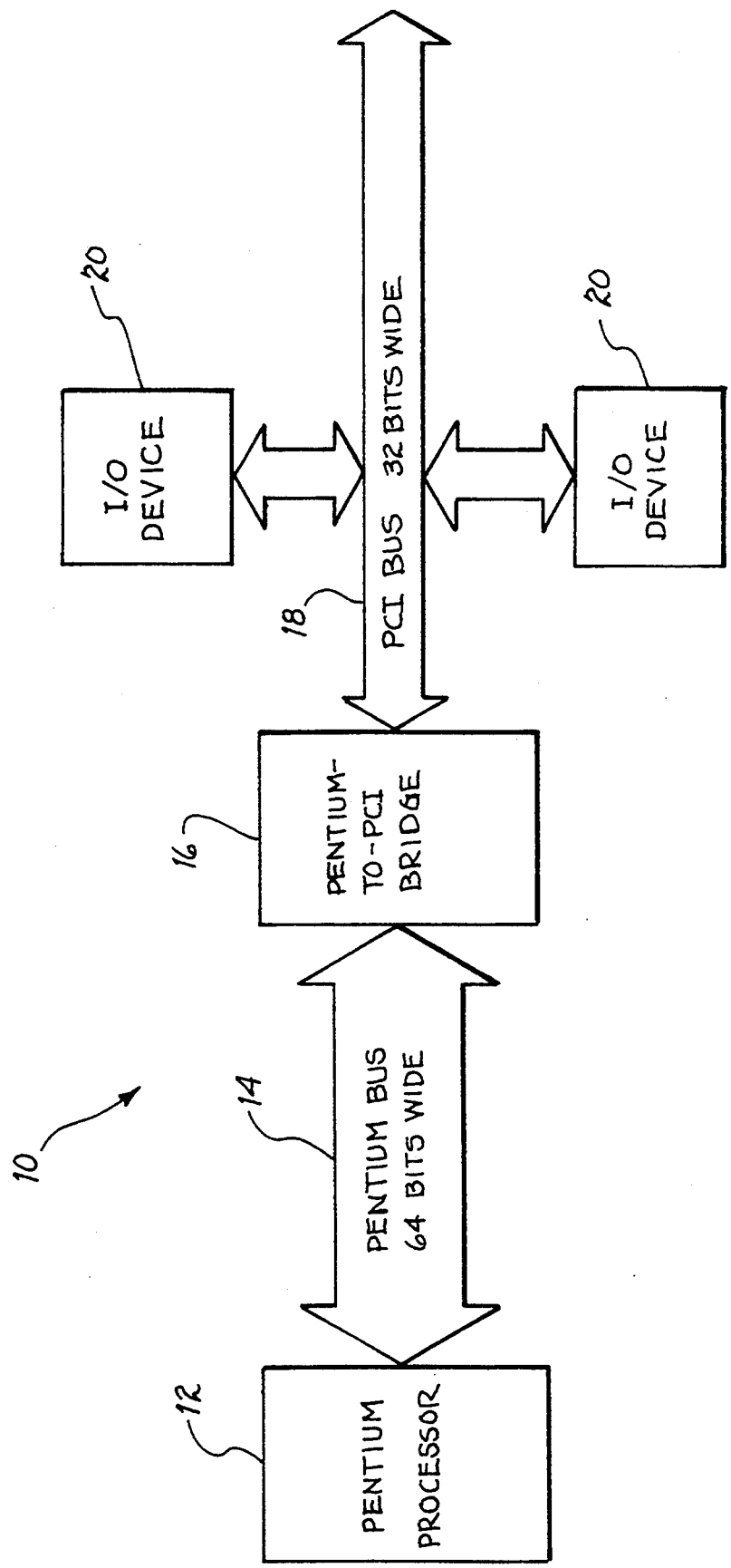
FIG. 1 is a block diagram showing the placement of a prior art Pentium-to-PCI bridge (Bridge) within a small computer system.

Referring to the figures, FIG. 1 shows a typical system 10 of the prior art, which has a Pentium Processor 12 with its 64-bit bus 14 connected to a Pentium-to-PCI Bridge (Bridge) 16. Bridge 16 is connected to a PCI Bus 18, which is in turn connected to several I/O Devices 20. Bridge 16 provides a means for converting 64-bit data transfers to and from Pentium Processor 12 to 32-bit data transfers on PCI Bus 18.

Figure 2:
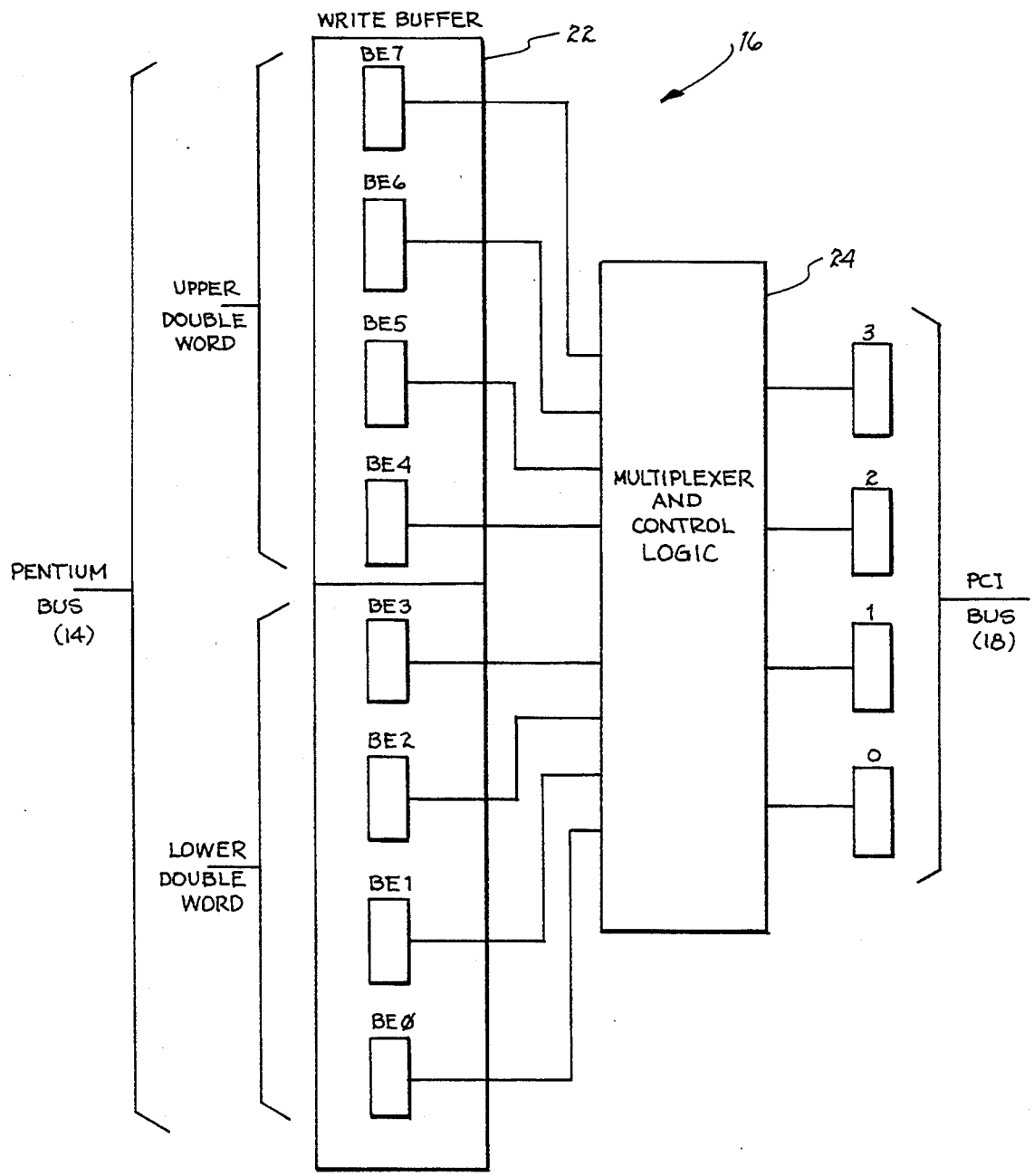
FIG. 2 is a block diagram of the Bridge of FIG. 1.

FIG. 2 illustrates the internal structure of Bridge 16 of FIG. 1. A Write Buffer 22 divides the input from the Pentium Bus 14 into an Upper Double Word and Lower Double Word as shown. The eight bytes within Write Buffer 22 are controlled by Multiplexer and Control Logic 24, and routed to the appropriate bytes on the PCI Bus 18 as required. Multiplexer and Control Logic 24 typically routes either the Upper Double Word or the Lower Double Word in their entirety to PCI Bus 18.

PCI Bus 18 of FIG. 1 has a fundamental bus cycle known as a burst that can transfer many bytes of data during one PCI bus write cycle. A burst is composed of an address phase and one or more data phases. The bursting capability of the PCI Bus 18 is well documented in the *PCI Local Bus Specification*, Rev. 2.0, at 3.2 (PCI Special Interest Group, Apr. 10, 1993).

Figure 3:
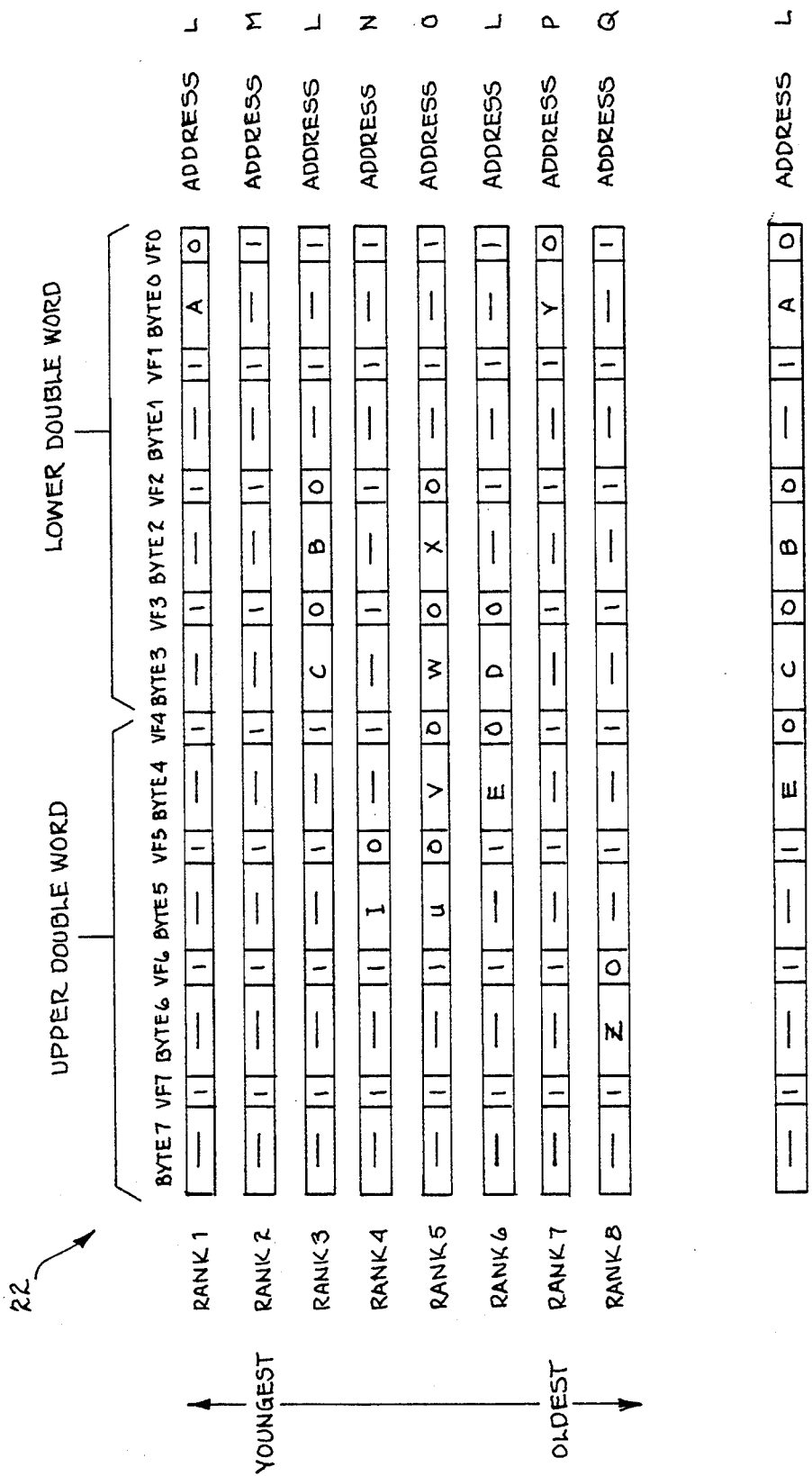
FIG. 3 is a block diagram of the write buffer of FIG. 2, which illustrates how the combine feature of the write buffer works.

The internal structure of Write Buffer 22 in FIG. 2 is shown in FIG. 3. Write Buffer 22 nominally has eight quad word locations known as ranks, with Rank 1 being the data most recently written (youngest) and Rank 8 being the data least recently written (oldest). Each rank within Write Buffer 22 is divided into eight bytes of data, from most significant to least significant, and each byte has a corresponding Verify Flag (VF). When the Verify Flag is 0, the data within the corresponding byte is valid, and when the Verify Flag is 1, the corresponding byte does not contain valid data.

Write Buffer 22 has an optional combine feature. When enabled, the combine feature causes data within Write Buffer 22 that is written to the same quad word address to be combined to minimize the number of PCI bus write cycles required to transfer this data. Thus, if one of the ranks within Write Buffer 22 contained a write of the upper four bytes to a quad word address, and another rank contained a write to the lower four bytes of the same quad word address, the data would be combined to form one PCI bus write cycle which would write these eight bytes by bursting two four-byte data phases onto PCI Bus 18.

While Pentium Processor 12 only writes contiguous data to Write Buffer 22, the combine feature of Write Buffer 22 can create non-contiguous data within a quad word to be transferred to the PCI Bus 18. This is illustrated in FIG. 3. Ranks 1, 3, and 6 all contain data to be written to quad word Address L. The other ranks within Write Buffer 22 contain data for other unique addresses. In Rank 1, Byte 0 is valid and contains data A. In Rank 3, bytes 2 and 3 are valid, and contain data B and C, respectively. In Rank 6, bytes 3 and 4 are valid, and contain data D and E, respectively. By combining the data in these three ranks, the resulting quad word to be written to Address L is shown at the bottom of FIG. 3. Note that the conflict between byte 3 in Rank 3 and byte 3 in Rank 6 is resolved in favor of the youngest data, that in Rank 3. The quad word to be written to the PCI bus now has valid data at byte 0, and bytes 2-4. Referring to FIG. 1, many I/O Devices 20 that may be coupled to PCI Bus 18 may not be able to handle transfers of non-contiguous data on a PCI bus write cycle. The prior art resolved this problem by creating separate PCI bus write cycles for non-contiguous data.

The method in accordance with the present invention allows Bridge 16 to detect when a combine has created non-contiguous data bytes, and allows writing of this non-contiguous data to PCI Bus 18 in a maximum of two PCI bus write cycles. Either or both cycles could contain more than one data phase. Each byte written by the Pentium Processor 12 has a corresponding Byte Enable (BE) line which goes low to indicate that this byte has valid data. These Byte Enable lines directly drive the Valid Flags of Write Buffer 22. The following boolean equation is true if the Lower Double Word (bytes 0-3) has all contiguous bytes, and is false if the Lower Double Word has non-contiguous bytes:

(VF3 and VF2) or (VF1 and VF0) or (not VF2 and not VF1)

This same equation can also determine whether the Upper Double Word has non-contiguous bytes by substituting VF4-VF7 for VF0-VF3, respectively.

When non-contiguous bytes are detected in either double word of a write buffer rank, two PCI bus write cycles are generated. The lower word of each double word that has non-contiguous bytes is written in the first PCI bus write cycle, and the remaining bytes in the upper word of the double word that has non-contiguous bytes is written in the second PCI bus cycle. For example, in the case where the Lower Double Word contains non-contiguous valid bytes of bytes 0, 2, 3, and the Upper Double Word contains valid byte 4, the first PCI bus cycle would write bytes 0 and 4 in a PCI bus write cycle that has two data phases, and the second PCI bus write cycle would write bytes 2 and 3 in a single data phase. This example is illustrated in the timing diagram of FIG. 4 in relation to the combined data in FIG. 3.

Figure 4:
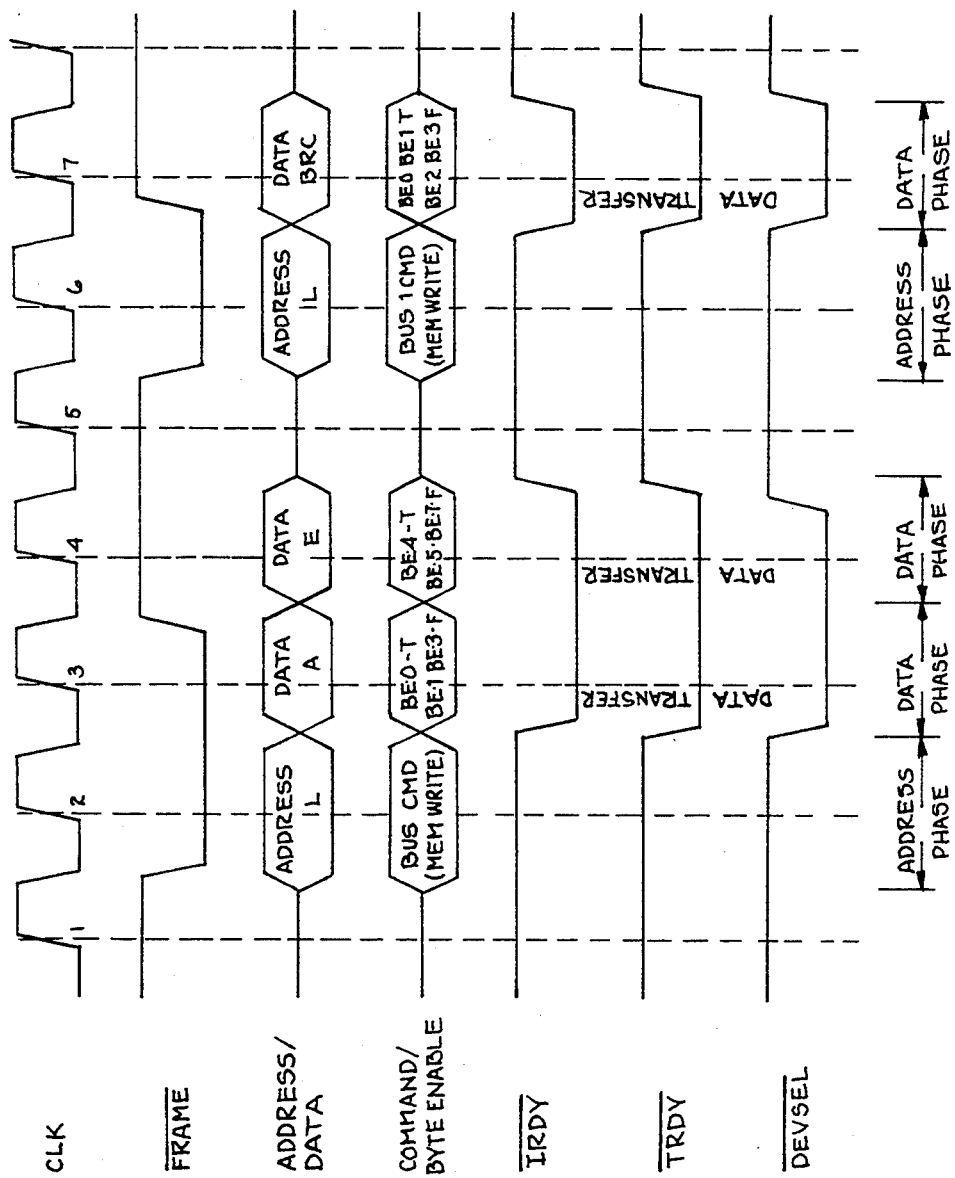
FIG. 4 is a timing diagram showing the write cycles required of the Bridge to write the non-contiguous bytes of the combined result in FIG. 3 to the PCI bus in accordance with the method of the present invention.

Referring now to FIG. 4, when Bridge 16 commences a PCI bus write cycle, it asserts the FRAME signal low, and drives Address and Command data onto the bus. The Command in this particular example is a Memory Write, and the Address is at the quad word address represented by Address L. Once the Command and Address have been driven on the PCI Bus, Bridge 16 asserts the Initiator Ready (IRDY) signal. The target I/O Device 20 must decode the address, and asserts DEVSEL to indicate to Bridge 16 that the target I/O Device 20 is responding properly. Assuming the target I/O Device 20 can accept the PCI bus write without inserting wait states, it asserts the Target Ready (TRDY) signal. Upon the next rising clock edge, data A is transferred to the target I/O Device 20 since both IRDY and TRDY were low. The data transferred depends on the state of the Byte Enable (BE) lines, which correspond to the Valid Flags (VF) of FIG. 3. Bridge 16 then drives data E during the next data phase of the same PCI bus write cycle, resulting in data E being transferred to the target I/O Device 20 one clock cycle after data A. According to PCI bus protocol, the target I/O Device 20 on the PCI Bus 18 knows that if multiple data phases are present, the address of the multiple data phases is one double word address higher than the original address driven at the beginning of the PCI bus write cycle. So by writing the A data to double word Address L, the target I/O device knows that data E resides in the next double word address that follows Address L.

Once Bridge 16 has transferred data A and data E on the first PCI bus write cycle, it initiates a second PCI bus write cycle, and during the single data phase it writes data B and C, as shown in FIG. 4. In this manner the method of the present invention transfers the contents of this combined quad word, which resulted in non-contiguous data, in a maximum of two PCI bus write cycles. The prior art would have required three separate PCI bus write cycles: one for data A, another for data B and C, and a third for data E. The method of the present invention thus reduces the number of required PCI bus write cycles from three to two in this specific example illustrated in FIG. 4.

In the worst-case scenario for non-contiguous bytes, combined data in Write Buffer 22 could result in bytes 1, 3, 5, and 7 being valid, creating non-contiguous data in both the Lower Double Word and the Upper Double Word. The prior art solution would create a PCI bus write cycle for each of these four valid bytes. The method in accordance with the present invention, however, would require only two write cycles. The boolean equation above would tell Bridge 16 that both double words contain non-contiguous data, and Bridge 16 would execute a first PCI bus write cycle, during which bytes 1 and 5 would be written in two separate data phases. During the second PCI bus write cycle, Bridge 16 would then write bytes 3 and 7 in two separate data phases. In this manner the method of the present invention requires a maximum of two PCI bus write cycles to transfer any combination of contiguous or non-contiguous data. While non-contiguous data requires multiple data phases during the PCI bus write cycle, this requires only one additional clock cycle. Initiating a separate PCI bus write cycle, however, requires at least one additional clock cycle to drive the Address and Command data onto the PCI bus. The method of the present invention therefore reduces the clock cycles required to transfer non-contiguous data to I/O Devices 20 on PCI bus 18, thereby increasing system speed.

The method of the present invention can be best understood by reference to the three different possible combinations of non-contiguous data bytes within the single combined data location within Write Buffer 22:

1) Lower Double Word has non-contiguous data, Upper Double Word does not;
2) Upper Double Word has non-contiguous data, Lower Double Word does not;
3) Both Lower Double Word and Upper Double Word have non-contiguous data.

If the Lower Double Word has non-contiguous data and the Upper Double Word does not, the first PCI bus write cycle will write the lower two bytes of the Lower Double Word during the first data phase, and will write all valid bytes (if any) in the Upper Double Word during the second data phase of this first PCI bus write cycle. The second PCI bus write cycle will then write the upper two bytes of the Lower Double Word.

If the Upper Double Word has non-contiguous data and the Lower Double Word does not, the first PCI bus write cycle will write all valid bytes (if any) in the Lower Double Word during the first data phase, and will write the lower two bytes of the Upper Double Word during the second data phase of this first PCI bus write cycle. (Note that if the Lower Double Word does not contain valid data, the lower two bytes of the Upper Double Word will be written during the first data phase of the first PCI bus write cycle.) The second PCI bus write cycle will then write the upper two bytes of the Upper Double Word.

If both the Lower Double Word and the Upper Double Word have non-contiguous data, the first PCI bus write cycle will write the lower two bytes of the Lower Double Word during the first data phase, and will write the lower two bytes of the Upper Double Word during the second data phase of this first PCI bus write cycle. The second PCI bus write cycle will then write the upper two bytes of the Lower Double word during the first data phase, and will write the upper two bytes of the Upper Double Word during the second data phase of this second PCI bus write cycle.

While the invention has been described in its preferred exemplary embodiment, it is to be understood that the words which have been used are words of description rather than limitation, and that changes may be made within the purview of the appended claims without departing from the true scope and spirit of the invention in its broader aspects. For example, it will be understood that, while various of the conductors (connections) are shown in the drawing as single lines, they are not so shown in a limiting sense, and may comprise plural conductor (connections), as is understood in the art. In addition, it will be understood by those skilled in the art that, in general, this method can be used with any 64 bit bus width microprocessor that interacts with I/O devices via a 32 bit bus.

What is claimed is:

1. A method for writing non-contiguous data to a Peripheral Component Interconnect (PCI) bus in a minimum number of write cycles including the steps of:

providing a PCI bus for transferring data to and from at least one input/output device;

providing bridge means coupled to the PCI bus for converting data transfers to and from a processor to transfers on the PCI bus;

providing a write buffer within the bridge means having a plurality of locations, each location having a lower double word and an upper double word, each of the double words nominally comprising four bytes each;

combining data in the plurality of locations that is written to a common address into a single location;

detecting when the combined data in the lower double word and the upper double word within the single location contains non-contiguous data;

1) if the lower double word of the single location contains non-contiguous data and the upper double word of the single location does not contain non-contiguous data:

a) writing the lower two bytes of the lower double word at the single location to the common address during a first data phase of a first PCI bus write cycle, and if the upper double word contains valid data, writing all valid bytes of the upper double word at the single location during a second data phase of the first PCI bus write cycle; and b) writing the upper two bytes of the lower double word at the single location to the common address during a first data phase of a second PCI bus write cycle;

2) if the upper double word of the single location contains non-contiguous data and the lower double word of the single location does not contain non-contiguous data:

a) writing any valid bytes of the lower double word at the single location to the common address during a first data phase of a first PCI bus write cycle;

b) writing the lower two bytes of the upper double word at the single location to the common address during a second data phase of the first PCI bus write cycle; and c) writing the two upper bytes of the upper double word at the single location to the common address during a first data phase of a second PCI bus write cycle;

3) if the lower double word of the single location contains non-contiguous data and the upper double word of the single location contains non-contiguous data:

a) writing the lower two bytes of the lower double word at the single location to the common address during a first data phase of a first PCI bus write cycle, and writing the lower two bytes of the upper double word during a second data phase of the first PCI bus write cycle; and b) writing the upper two bytes of the lower double word at the single location to the common address during a first data phase of a second PCI bus write cycle, and writing the upper two bytes of the upper double word during a second data phase of the second PCI bus write cycle.

2. The method according to claim 1 wherein the step of detecting when the combined data in the lower double word within the single location contains non-contiguous data is accomplished by evaluating the following equation, wherein a true result indicates the absence of non-contiguous data and a false result indicates the presence of non-contiguous data:

(VF1 and VF0) or (VF3 and VF2) or (not VF2 and not VF1), where VF0, VF1, VF2 and VF3 are verify flags within the single location, a low signal on at least one of VF0 and VF1 indicating the presence of valid data within corresponding bytes 0 and 1 in the lower double word of the single location, and a low signal on at least one of VF2 and VF3 indicating the presence of valid data within corresponding bytes 2 and 3 in the lower double word of the single location.

3. The method according to claim 1 wherein the step of detecting when the combined data in the upper double word within the single location contains non-contiguous data is accomplished by evaluating the following equation, wherein a true result indicates the absence of non-contiguous data and a false result indicates the presence of non-contiguous data:

(VF5 and VF4) or (VF7 and VF6) or (not VF6 and not VF5)

where VF4, VF5, VF6 and VF7 are verify flags within the single location, a low signal on at least one of VF4 and VF5 indicating the presence of valid data within corresponding bytes 4 and 5 in the upper double word of the single location, and a low signal on at least one of VF6 and VF7 indicating the presence of valid data within corresponding bytes 6 and 7 in the lapper double word of the single location.

* * * * *